Dec. 10, 1935.  A. P. ROBINSON  2,023,699
VEHICLE VENTILATING MEANS
Filed June 11, 1934    4 Sheets-Sheet 1
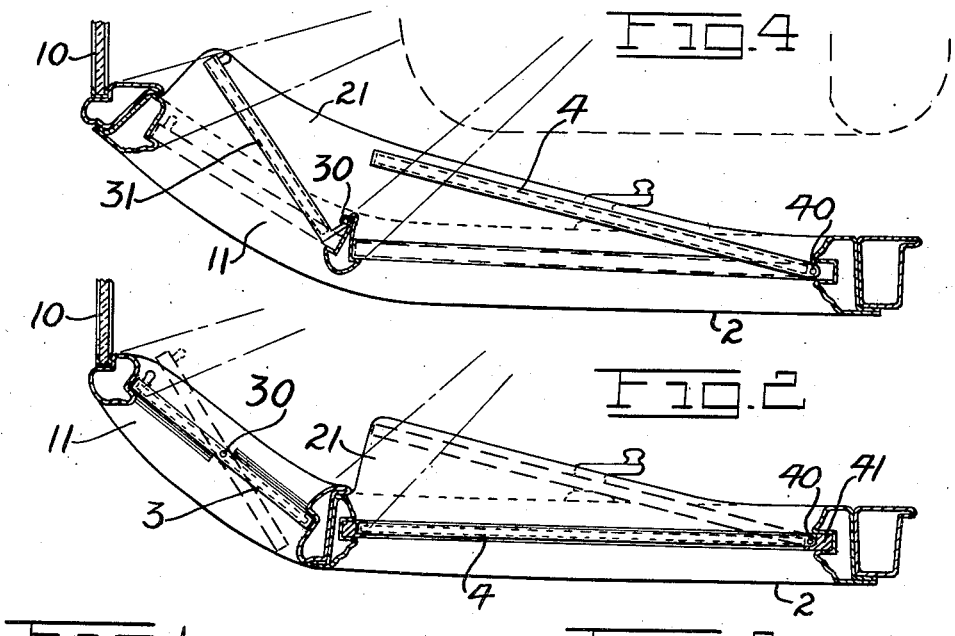
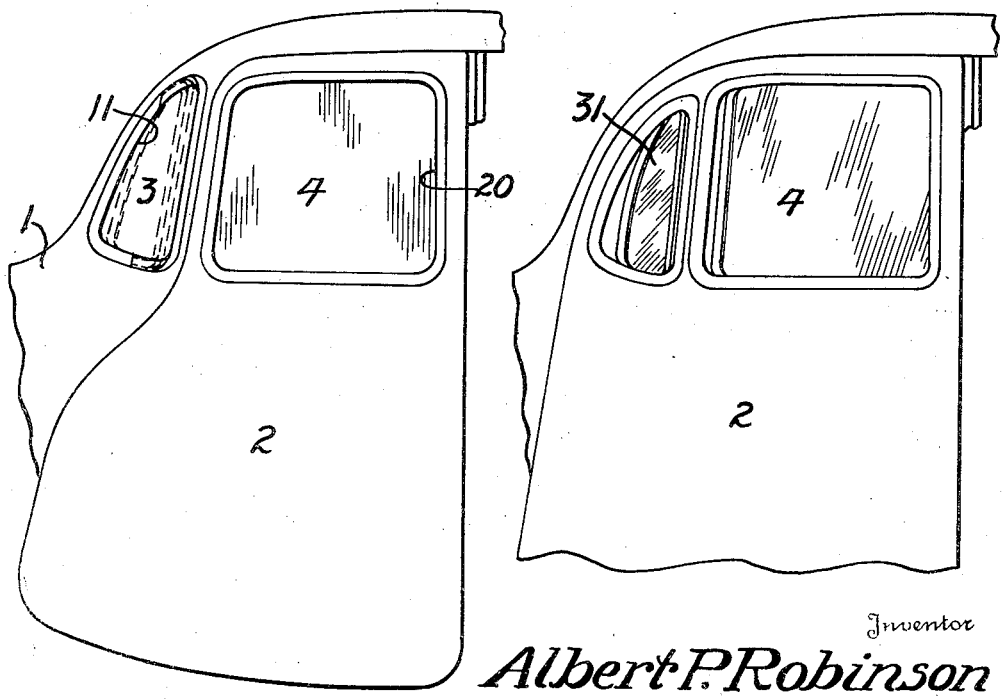
Inventor
Albert P. Robinson
By Charles L. Reynolds
Attorney Dec. 10, 1935.  A. P. ROBINSON  2,023,699
VEHICLE VENTILATING MEANS
Filed June 11, 1934  4 Sheets-Sheet 2
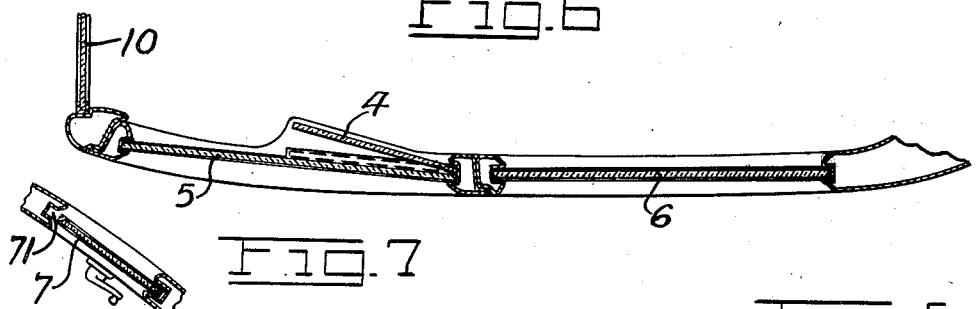
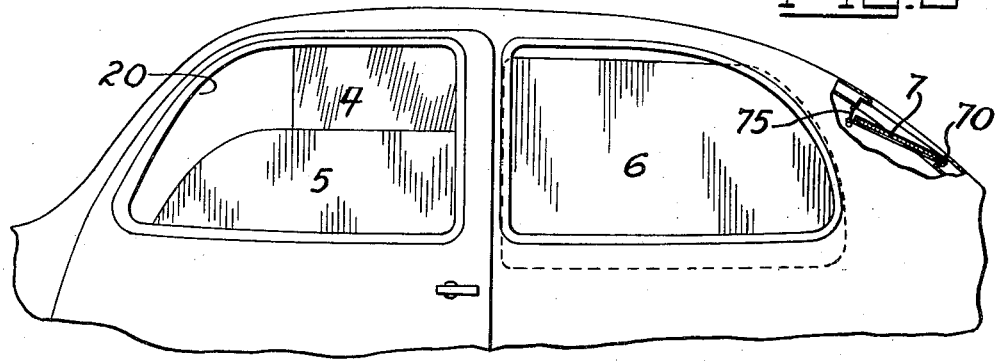
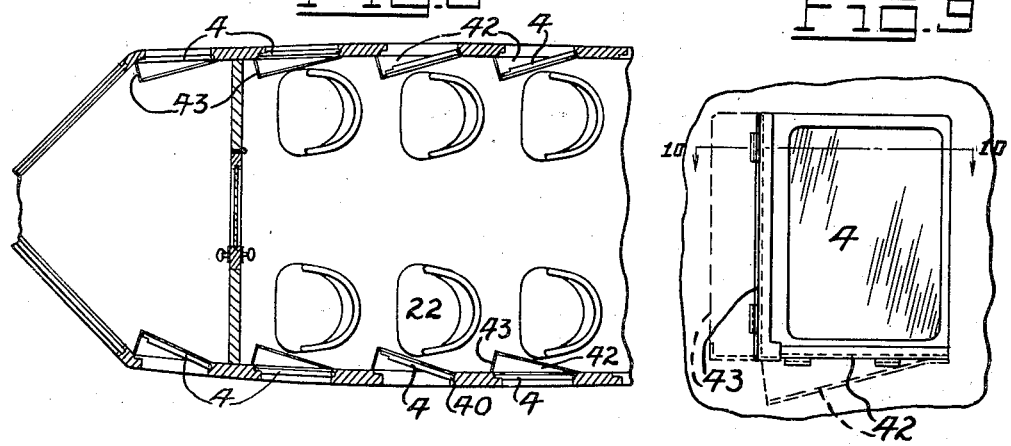
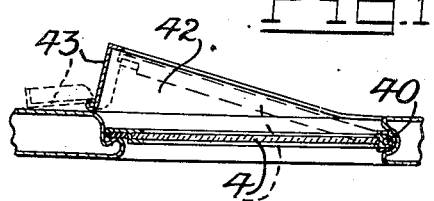
Inventor
Albert P. Robinson
By Charles L. Reynolds
Attorney

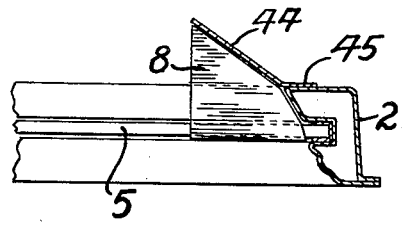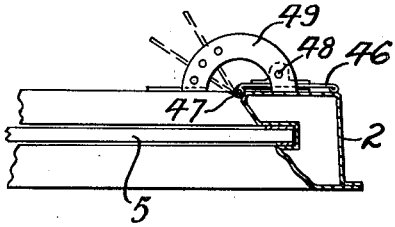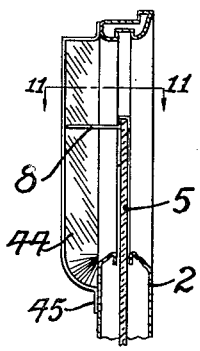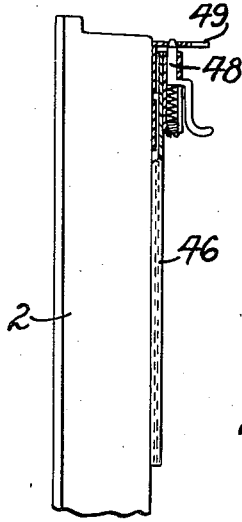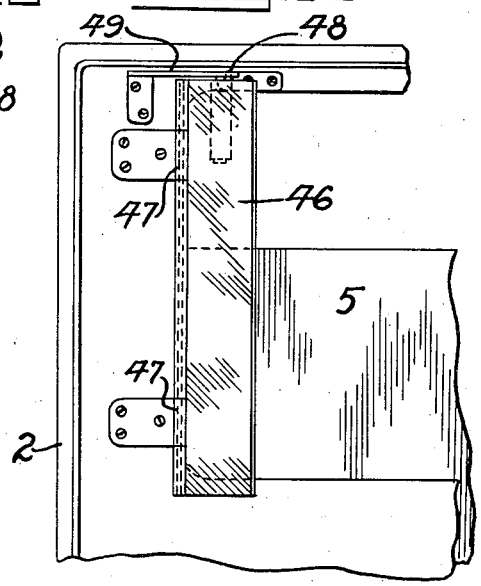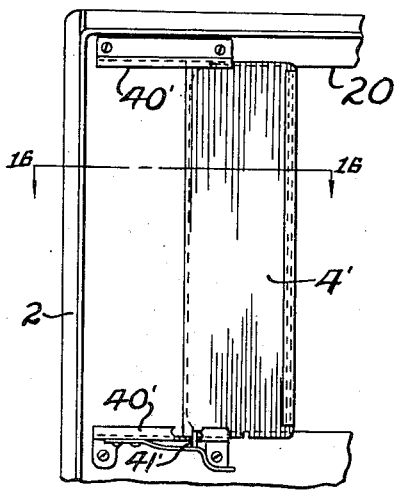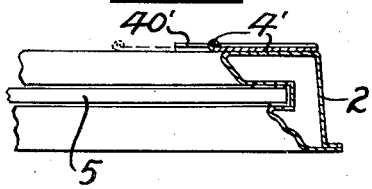

Dec. 10, 1935.  A. P. ROBINSON  2,023,699
VEHICLE VENTILATING MEANS
Filed June 11, 1934   4 Sheets-Sheet 4
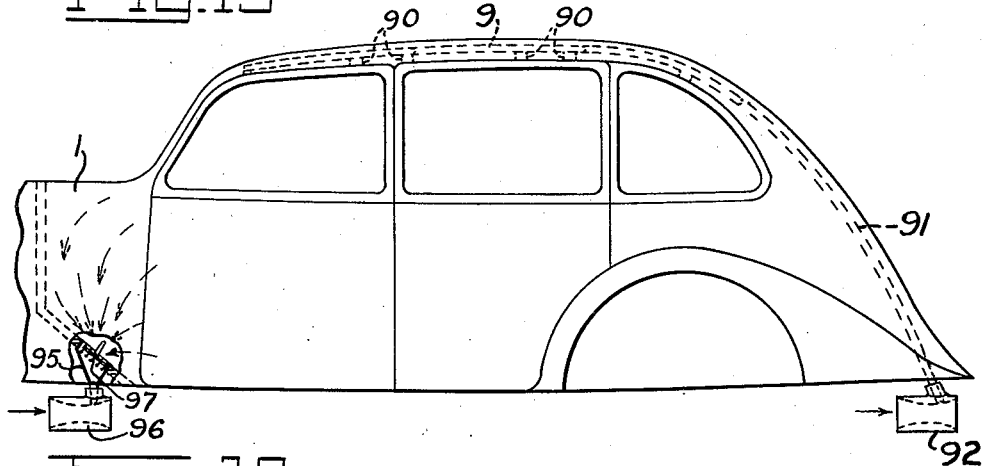
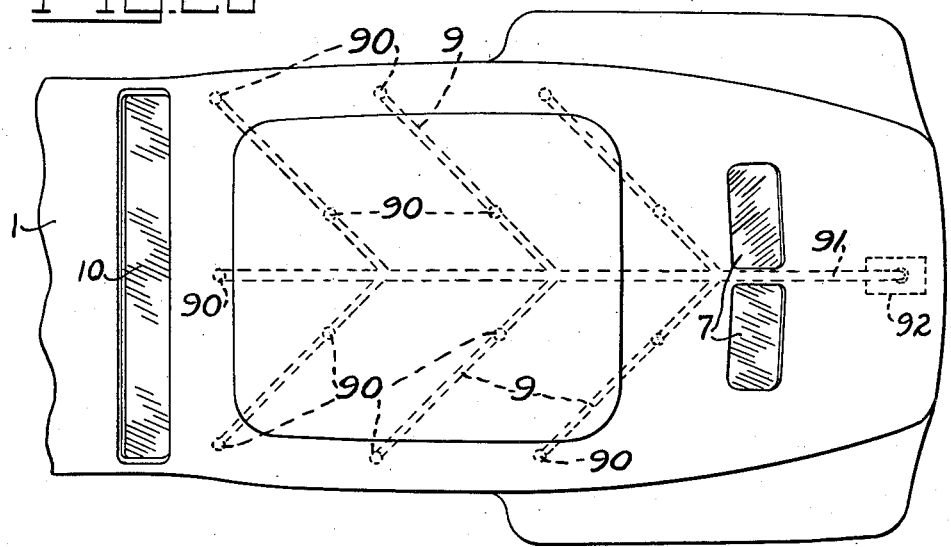
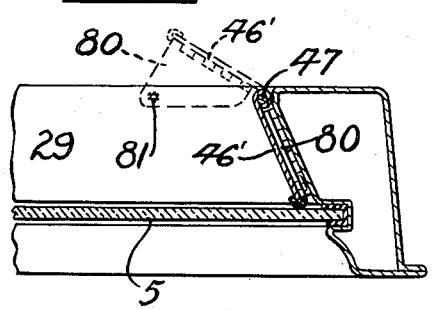
Inventor
Albert P. Robinson
By Charles L. Reynolds
Attorney Patented Dec. 10, 1935

2,023,699

UNITED STATES PATENT OFFICE 2,023,699

VEHICLE VENTILATING MEANS

Albert P. Robinson, Seattle, Wash.

Application June 11, 1934, Serial No. 730,008

12 Claims. (Cl. 296—44)

My invention relates to ventilating arrangements for vehicle bodies. While primarily designed for automobiles, of which a high percentage are closed body types, the invention will also be found advantageous for airplane cabins and like swiftly moving, streamlined vehicles having closed bodies.

It detracts considerably from the streamline contour of modern vehicles of the general type mentioned, and adds materially to the drag developed, if, for purposes of ventilation, or for any purpose, as clear vision, signaling, etc., it is necessary to provide wind wings or deflectors which project from the contour of the vehicle outwardly into the relatively rearwardly moving air. Such deflectors, sloping rearwardly, produce a drag and eddy currents all out of proportion to their size. On the other hand, any depression or opening in the streamline contour of such a vehicle induces an eddy current which will sweep drafts into such an opening, and if this is permitted it causes such a draft upon the occupants as to be not only disagreeable, but in many cases positively harmful, and on dusty roads cannot be tolerated. Nevertheless with closed bodies it is essential that means be provided for ventilating the interior of these bodies, and in bad weather it is essential that the driver have clear, unobstructed vision.

It is one of the objects of my invention, then, to provide ventilating means for such bodies which will produce a minimum of resistance and interruption to the streamline contour by reason of not projecting outside of that streamline contour, and which will yet guard occupants against direct drafts, and insure a satisfactory amount of ventilation, effecting removal of the air in such a way as to avoid drafts.

In connection with this general object it is a further object to provide means to the end indicated which are so designed and arranged as to afford better vision to the occupants of the vehicle, especially the driver, and further, to provide such means as conform to or are adaptable to structures now employed in such bodies, thereby requiring a minimum of change of design in the bodies and operating parts.

Regardless of how air is admitted, it is a problem to insure removal of stale or humid air, or an excess of air, from within the body, and a further object is to provide for such removal without discomfort to occupants, and without impeding the vehicle—in fact, to lessen its drag.

Other objects pertain more particularly to details and structural arrangements, and these will be understood as the description progresses.

My invention comprises the novel arrangement of elements and certain novel structural forms, as shown in the accompanying drawings, and as will be hereinafter described and more particularly claimed.

In the accompanying drawings I have shown my invention embodied in various illustrative forms and details, incorporated in a streamlined automobile body, and also in an airplane cabin.

Figure 1 is an elevation of the front part of an automobile, including the windshield and door, incorporating certain principles of my invention, and Figure 2 is a horizontal sectional view through the same, taken at about the still level.

Figure 3 is a a view similar to Figure 1, showing a modified arrangement to the same end, and Figure 4 is a view similar to Figure 2 of this latter form.

Figure 5 is a side elevation of a car body, illustrating a modified arrangement, and Figure 6 is a horizontal sectional view through a side of the same.

Figure 7 is a vertical sectional view of a modified arrangement for exhausting the air, as a substitute for that shown in Figure 5.

Figure 8 is a horizontal sectional view through an airplane cabin, illustrating my arrangement incorporated therein.

Figure 9 is a side elevation of an individual window opening in such cabin, and Figure 10 is a horizontal sectional view through such window opening, on the line 10—10 of Figure 9.

Figure 11 is a horizontal sectional detail on the line 11—11 of Figure 12, and Figure 12 is a vertical sectional view, illustrating a different arrangement of the baffling means.

Figure 13 is a horizontal sectional detail, Figure 14 an inside elevation, and Figure 15 an edge elevation of a further modified form of baffle.

Figure 16 is a section on line 16—16 of Figure 17, and Figure 17 is an inside elevation of a further modified baffle.

Figure 18 is a horizontal sectional view of a further modified baffle arrangement.

Figure 19 is a side elevation of a car body, showing a means for exhausting air from the interior, and Figure 20 is a plan view of the same.

Bearing in mind the necessity for good vision on the part of the driver, and the necessity of providing some opening for the admission of fresh air which will produce the minimum of drag and prevent any draft upon the occupants, this may best be acomplished by providing, for one or more of the window openings of the body, a baffle which is disposed with its rear edge adjoining the rear edge of the window opening, and which is inclined forwardly and inwardly from such rear edge to leave a space between the front edge of the window opening and the front edge of the baffle. This baffle may constitute, in part or wholly, the window closure, or may be supplementary thereto. Since it will not be sufficient merely to baffle and direct outwardly the inwardly directed eddy currents by such baffling means, if they are permitted to go around the edges of the baffle, I contemplate employing in some instances a stop device in the nature of supplementary baffles, for instance a horizontal baffle, which may in some instances be formed as an integral part of the sill, window frame, or soffit, extended inwardly to the limit of the inward projection of the forward edge of the baffle, thus preventing entrance of air by sweeping under or over the baffle. In other instances such supplementary baffles may move with the main closure. It may in some instances be desirable to prevent the eddy currents, which might be quite violent in the case of a vehicle moving so rapidly as an airplane, from sweeping in around the front edge of the baffle. I may in some instances provide closure means for the space between the forward edge of the opening and the forward edge of the baffle.

It will seldom be objectionable, however, to admit air above the baffle, the upper edge of which is above the heads of occupants, and therefore in most instances the upper edge of the baffle will be spaced below the ceiling of the body, so that air may enter here, but in thus entering it will be small in amount, because the spacing is not great, and will be taken in at such a point and so directed that it does not throw any direct draft on the occupants. Moreover it is my purpose to exhaust air, positively or permissively, from the interior of the vehicle body, and preferably by means which are disposed in the upper part of the body, for instance in the ceiling or by means of an inwardly and forwardly opening rear window. Hence air taken in at the top of the body will be soon exhausted through the exhaust means located in the top, and while some part of the fresh air may be lost in this way, it is a simple matter to regulate the amount of fresh air admitted so that it will be sufficient for all purposes, and its movement will induce movement of air from the lower part of the vehicle. Furthermore, it may be exhausted in such a way or at a point of negative pressure, so as to overcome any negative resistance of the rear part of the body, thus lessening the drag on the body, and yet a current of sufficient strength to accomplish this can be moved through the vehicle, always close to the ceiling, without any unpleasant effect on the occupants.

With regard to the baffle at the window opening, this, as I have indicated, may be the closure itself or a supplemental member and it may be fixed in its inwardly and forwardly directed position, or may be movable into such position from another position. In any such position it may be partly operative or wholly inoperative. Ordinarily it would be of glass or like transparent material, but it is not outside the scope of my invention to make it of metal or other opaque material, in certain forms, at least.

In all such vehicles the driver's vision is generally most obstructed by a corner post at the junction between the windshield and the side of the body. In streamlining such bodies, particularly if widened at the front as is becoming common, there is afforded opportunity to make the space intervening between the windshield and the forward window as a smooth curve merging into each, and to locate in this intervening area a window opening which can be utilized as part of the ventilating system. This extra intervening window may be disposed either in the body proper or in the door in which the front window is mounted.

If the window opening is part of a streamlined curve, or indeed, in any event, the inward extent of the baffle should preferably be sufficient to intercept all direct drafts past the forward edge of the window opening. The inward extent of the baffle is therefore dependent in some measure upon the extent of the window opening which it protects, upon the contour of the structure in which it is embodied, upon the necessity of retaining unobstructed vision for the driver, and upon the degree of baffling desired.

Such features are incorporated in various forms in the arrangements shown in the drawings, to which reference will now be made by way of illustrating the principles outlined above.

In Figure 1 the body is generally indicated by the numeral 1, and has a door 2 with a window aperture 20, beneath which is the normal window well for storage of the glass closure panel. As may be seen in Figure 2, the body incorporates a windshield 10, and is streamlined from the side of the windshield around to the side of the body or door 2, and otherwise is of streamline shape. In this space is formed a somewhat triangular window opening 11, which gives the driver improved vision, as may be seen by the dot-and-dash lines. This opening is closed with a suitable glass panel 3, and preferably this is hinged on an upright axis, indicated at 30, whereby it can swing its forward edge inwardly somewhat, and its rearward edge outwardly, but still not sufficiently to project any part outside the streamline contour of the body. Some eddy currents may enter between the forward edge of the closure 3 and the opening 11, and some air may be exhausted through the space at the rear of the closure, when thus swung, but no direct draft can strike the driver, who would normally be the nearest occupant.

The opening 20 is closed by a suitable glass panel 4, and when this is the sole closure for the opening 20, this panel 4 is also preferably swingable on an axis 40 at its rear edge, so that it may swing into the body, permitting entrance of air around its front edge, but still preventing any direct draft striking the occupants. This panel may be mounted in a frame 41 which is slidable in the ordinary manner into the window well below the window opening 20 when the panel is in registry with this frame 41. To prevent downward draft the sill 21 may be extended inwardly to the inward limit of movement of the panel, so that no space is left for entrance of draft underneath the panel. As indicated above, it is preferred that the panel be spaced at its upper edge, when swung inwardly, from the ceiling within the body.

A similar result can be obtained by the form shown in Figures 3 and 4, where the panels 31 and 4 correspond respectively to the panels 3 and 4 in the preceding form. Both of these are shown mounted in the door 2, which is curved in streamline shape to join the body at the side of the windshield. The hinge 30 of the panel 31, however, is shown as located at the rear edge of the opening 11, and the sill 21 is further extended in this form to include the inward limit of swing of the panel 31. It is not necessary that this panel be vertically movable, though the panel 4 is so shown.

In Figures 5 and 6 the panel 4 is shown as supplementary to the normal or any suitable window closure 5, which may be vertically slidable in the normal manner, and thus no matter where the window glass 5 may be positioned, the panel 4 serves as a baffle to protect the driver, and this will be the case whether it is positioned parallel to the glass 5 in the position where it may be moved into the window well, or swung inwardly or merely vertically movable in the angular position shown in full lines in Figure 6. Each of these panels 4 and 5 would normally be independently movable vertically. In its operative or inwardly swung position the front edge of panel 4 is inside of the front edge of the window opening 20, as is clear in Figure 6.

So, too, the rear window 6 may be vertically movable to leave a space at its top for intake of air, and by extending it rearwardly to a somewhat greater extent than the contour of the rear window opening would require, as may be seen by the dotted lines in Figure 5, the rear panel 6 will not permit any opening at the rear of the opening until it has been dropped to a considerable extent below its uppermost position.

In this form I have also illustrated a means for exhausting air from the upper part of the body. In Figure 5 this is shown as a rear window 7 which is hinged at its lower edge at 70 to swing downwardly and inwardly to a limited extent permitted by the stop 75. The same result may be accomplished by the arrangement shown in Figure 7, wherein this window 7 is slidable in its own plane to a limited extent, to leave a gap 71 at its upper edge, out of which air may pass.

In Figures 8, 9 and 10 a somewhat similar idea has been shown incorporated in an airplane cabin. The closure 4 for each window opening may swing inward into the cabin by pivoting at 40 at their rear edges, and in order to prevent a downward draft there may be provided a hingedly mounted baffle 42 which may swing up to engage the lower edge of the inwardly swung panel 4, and in order to prevent eddy currents passing into the forward edge of the closure from sweeping into the cabin, I may provide a hingedly mounted baffle 43 inside the forward edge of the window opening, which will swing into engagement with the inwardly swung forward edge of the panel 4. Thus there will be left only an opening over the top of the inwardly swung panel for entrance of air above the heads of occupants of the seat 22 alongside each window.

Instead of employing a glass panel or baffle I may employ one of metal, as indicated at 44 in Figure 11, which may be suitably fixed in position by means of flanges 45 adapted to be secured to the door 2 or other part of the body wherein is formed the window opening. Since the window glass 5, when used with any of the baffles heretofore described, may be positioned in various positions between full closed and full open, I may provide a supplementary baffle 8 which is mounted upon the upper edge of the glass 5, and which slides therewith, closing the space between the baffle 44 and the upper edge of the window panel, wherever this upper edge may be located.

It may be desirable to adjust the angularity or the position of such a panel as 44, or to store it in an inoperative position, and in Figures 13, 14 and 15 I have shown various arrangements to this end. The panel 46 is hinged at 47, and in stored position lies closely adjacent to the inside edge of the door 2 or like support, but is provided with a locking pin 48 cooperating with a quadrant 49, whereby it may be held in any one of a plurality of operative positions or in the inoperative position.

The baffle need not be angularly disposed with relation to the window opening, especially if the window opening be not curved as viewed in plan, though preferably it is thus disposed. However, in Figures 16 and 17 I have shown a baffle 4' slidably mounted in guides 40' supported on the door adjacent to the window opening, and held in various adjusted positions by a locking pin 41', so that it may be slid from an inoperative position, shown in full lines in Figure 16, into any one of a series of operative positions, one of which is shown in Figure 17.

A further style of mounting for a hinged baffle is shown in Figure 18, where such a baffle 46', hingedly mounted at 47, is stored on the inside edge of the window opening, and at such an angle that it can only be swung into operative position when the window closure 5 is dropped into the window well. The baffle 46' has hinged to it a small vane or baffle 80 which, when the baffle is swung inwardly, may be dropped down into engagement with the sill 29, and may be provided with a suitable catch, indicated at 81, for engagement with a complemental catch on the sill, to hold the baffle 46' and the vane 80 in operative position.

I preferably provide positive means for exhausting air from the interior of the body, and for insuring that it is taken out from the upper part of the vehicle, near the ceiling, and to this end I may provide in the ceiling of the body a series of conduits 9 having small entrance ports 90 spaced about the top of the vehicle, and all leading to a main conduit 91. With this conduit 91 I intend to associate some positive means for drawing air outward through the conduit and through the various branch conduits, and such a means is indicated as the Venturi sleeve 92, located in a position to intercept relatively rearwardly moving air, thereby creating a vacuum and drawing air outwardly through the conduit 91. Such a Venturi device may be located below the body, or in any other convenient location, and instead of a Venturi device there may be employed any suitable arrangement for positively withdrawing the air.

While the exhaust of air from above the heads of occupants will normally be sufficient for all purposes, at times it may be desirable to exhaust air near the floor, to cool the lower part of the car, or to remove fumes from the motor. To permit this I have shown a supplementary exhaust conduit 95 in Figure 19, opening in the floor boards, and connected to a venturi 96, which can be used when necessary. Any closure 97 to prevent exhaust of air therethrough, or to control its velocity, may be used, as is found necessary.

While I have described in detail various arrangements of baffles and like devices, and various exhaust means, it will be understood that these illustrations are given purely to make clear the principles enunciated at the outset of this specification, and that various other arrangements for accomplishing the intended results may be substituted therefor without departing from the spirit of my invention as defined in the following claims.

What I claim as my invention is:

1. A vehicle body including a windshield, disposed in a plane transversely of the body, and a door, disposed in a plane longitudinally of the body, including a window opening spaced rearwardly of and at the side of said windshield, the area intervening between the forward door edge and the windshield being of curved conformation in projection on a horizontal plane, and a glass panel pivotally disposed in said area upon an upright axis, to swing its forward edge inwardly into the body.

2. A vehicle body including a windshield disposed in a plane transversely of the body, and a door, disposed in a plane longitudinally of the body, rearwardly of and at the side of said windshield, and including a window opening spaced rearwardly of the windshield, said door having a further opening in the area forwardly of the first opening, such area being of curved formation in projection on a horizontal plane, and merging with the contour of the windshield, and a glass panel pivotally disposed upon an upright axis in said second opening, to swing its forward edge inwardly into the body.

3. In combination with a vehicle body having a window opening therein, a panel to close said window opening, pivot means supporting said panel substantially at its rear edge to swing its forward edge inwardly from the window opening, and means engageable by said panel to interdict swinging of its forward edge outwardly from the window opening.

4. In combination with a vehicle body having a window opening therein, a panel to close said window opening, pivot means supporting said panel substantially at its rear edge to swing its forward edge inwardly from the window opening, and a window sill extending inward from the window opening beneath the panel in its inwardly swung position.

5. In combination with a vehicle body having a window opening therein, a panel to close said window opening, pivot means supporting said panel substantially at its rear edge to swing its forward edge inwardly from the window opening, and means guiding said panel for movement in the plane of the window opening to open the window opening.

6. A vehicle body having a window opening therein, a window frame guided for vertical movement into and from said window opening, a single panel received in and filling said window frame to close the window opening, and pivot means supporting said panel by its rear edge and mounted at the rear of said window frame for inward swinging of the front panel edge from registry with the window opening.

7. A vehicle body having a window opening therein, and a closure member for closing said window opening, movable inwardly from the plane of the window opening to leave a ventilating opening, and operating, when thus disposed wholly within the vehicle, to deflect outwardly and rearwardly air tending to flow in a direction inwardly and rearwardly through the window opening, and means to interdict movement of any part of said closure member outward beyond the contour of the outer body surface.

8. A vehicle body wall having a window opening therein, a panel closing said window opening, pivot means supporting said panel substantially at its rear edge to swing its forward edge inwardly from the window opening, means engageable by said panel to interdict swinging of its forward edge outwardly from the window opening, a second panel for closing the gap between the forward edge of said first panel in inwardly swung position and the body wall, and a third panel for closing the gap between the lower edge of said first panel in inwardly swung position and the body wall.

9. A vehicle body having two adjacent window openings therein disposed at an angle to each other, and a panel closing each window opening and each panel being pivoted substantially at its rear edge to swing its forward edge inwardly, whereby air may enter the body through the forward edge of the front window opening, and exit through the forward edge of the rear window opening.

10. A vehicle body wall having two adjacent window openings therein disposed at an angle to each other, a panel closing each window opening and each panel being pivoted upon an upright axis to swing its forward edge inwardly, and means projecting laterally inward from said body and extending unbroken beneath both of said panels below the window openings, to close the gaps between the lower edges of said panels, when in inwardly swung position, and the body wall, whereby air may enter the body through the forward edge of the front window opening and exit through the forward edge of rear window opening, but will be prevented from entering beneath the front panel.

11. A vehicle body having two adjacent window openings therein, a panel closing the rear window opening and movable to provide a ventilating opening, a second panel closing the front window opening and pivoted upon an upright axis substantially at its rear edge to swing its forward edge inwardly to leave a ventilating opening, and a member projecting laterally inward from said body beneath the front window opening to close the gap between the lower edge of the front panel, when in inwardly swung position, and the vehicle body, whereby air may enter the body through the forward edge of the front window opening and exit through the rear window opening, but will be prevented from entering beneath the front panel.

12. A vehicle body having two adjacent window openings therein, a panel closing the front window opening and movable to provide a ventilating opening, and a second panel closing the rear window opening and pivoted substantially at its rear edge to swing its forward edge inwardly, whereby air may enter the body through the front window opening and exit through the forward edge of the rear window opening.

ALBERT P. ROBINSON.